(12) United States Patent
Nishimura et al.

(10) Patent No.: US 12,709,134 B2
(45) Date of Patent: Aug. 18, 2026

(54) IN-VEHICLE TEMPERATURE CONTROL SYSTEM

(71) Applicant: TOYOTA JIDOSHA KABUSHIKI KAISHA, Toyota (JP)

(72) Inventors: Yusuke Nishimura, Toyota (JP); Hirotaka Sasaki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 53 days.

(21) Appl. No.: 18/794,120

(22) Filed: Aug. 5, 2024

(65) Prior Publication Data

US 2025/0144974 A1 May 8, 2025

(30) Foreign Application Priority Data

Nov. 6, 2023 (JP) ................................ 2023-189624

(51) Int. Cl.
*B60H 1/00* (2006.01)
*B60H 1/32* (2006.01)

(52) U.S. Cl.
CPC ..... *B60H 1/00892* (2013.01); *B60H 1/00849* (2013.01); *B60H 1/3205* (2013.01); *B60H 1/00278* (2013.01); *B60H 2001/3272* (2013.01)

(58) Field of Classification Search
CPC ........... B60H 1/00892; B60H 1/00849; B60H 1/3205; B60H 1/00278; B60H 2001/3272; B60H 1/143; B60H 1/32284; B60H 2001/00307
See application file for complete search history.

(56) References Cited

U.S. PATENT DOCUMENTS

2020/0353790 A1* 11/2020 Miyoshi ............. B60H 1/32284
2021/0300144 A1* 9/2021 Kawabe .................... B60L 1/02
2022/0009309 A1 1/2022 Miura et al.

FOREIGN PATENT DOCUMENTS

JP 2004-106671 A 4/2004
JP 2004360933 A * 12/2004
JP 2020-165604 A 10/2020
JP 2020-185829 A 11/2020
JP 2021-127869 A 9/2021
WO WO-2014027504 A1 * 2/2014 ................ F25B 5/02
WO WO-2022181110 A1 * 9/2022 ................ F25B 1/00
WO WO-2023120271 A1 * 6/2023 ............ F25B 25/005

* cited by examiner

*Primary Examiner* — Kun Kai Ma
(74) *Attorney, Agent, or Firm* — SoraIP, Inc.

(57) ABSTRACT

The in-vehicle temperature control system of the present disclosure includes a low-temperature coolant circuit and a high-temperature coolant circuit that are capable of exchanging heat through a refrigerant circuit, a low-temperature side heat exchanger provided in the low-temperature coolant circuit, a high-temperature side heat exchanger provided in the high-temperature coolant circuit, and a common heat radiation unit. The in-vehicle temperature control system executes heat radiation suppression control for suppressing exhaust heat from the high-temperature side heat exchanger under a predetermined condition in which cooling in the low-temperature coolant circuit that is performed based on a state of a unit that is cooled by exhaust heat from the low-temperature side heat exchanger is prioritized, based on the state of the unit.

8 Claims, 3 Drawing Sheets

IN-VEHICLE TEMPERATURE CONTROL SYSTEM

CROSS-REFERENCE TO RELATED APPLICATION

This application claims priority to Japanese Patent Application No. 2023-189624 filed on Nov. 6, 2023, incorporated herein by reference in its entirety.

BACKGROUND

1. Technical Field

The present disclosure relates to an in-vehicle temperature control system.

2. Description of Related Art

Japanese Unexamined Patent Application Publication No. 2021-127869 (JP 2021-127869 A) discloses a heat exchanger that performs heat exchange between a heat medium and air, the heat exchanger having a configuration in which a plurality of heat medium flow paths shares a heat radiation fin and a louver.

SUMMARY

When a low temperature-side heat exchanger provided in a low temperature water cooling circuit and a high temperature-side heat exchanger provided in a high temperature water cooling circuit are integrated in the above-described configuration, the low temperature-side heat exchanger and the high temperature-side heat exchanger being included in the in-vehicle temperature control system, heat exhaust from the high temperature-side heat exchanger having a large temperature difference with outside air is physically prioritized, so that there is a concern that a cooling capacity shortage is caused due to insufficient heat exhaust from the low temperature-side heat exchanger.

The present disclosure has been made in view of the above problem, and an object of the present disclosure is to provide an in-vehicle temperature control system capable of suppressing a cooling capacity shortage.

In order to solve the above-described problem and achieve the object, an in-vehicle temperature control system according to the present disclosure includes a low temperature water cooling circuit and a high temperature water cooling circuit that are configured to exchange heat through a refrigerant circuit. In the in-vehicle temperature control system, a low temperature-side heat exchanger provided in the low temperature water cooling circuit and a high temperature-side heat exchanger provided in the high temperature water cooling circuit include a common heat radiation portion. The in-vehicle temperature control system executes heat exhaust suppression control for suppressing heat exhaust from the high temperature-side heat exchanger under a predetermined condition that gives priority to cooling in the low temperature water cooling circuit determined in advance, based on a state of a unit to be cooled by heat exhaust from the low temperature-side heat exchanger.

As a result, as the heat exhaust from the high temperature-side heat exchanger is suppressed, the heat exhaust from the low temperature-side heat exchanger is promoted, and the cooling capacity shortage can be suppressed.

In addition, in the above, the heat exhaust suppression control may be executed as control for suppressing an amount of heat transferred from the refrigerant circuit to the high temperature water cooling circuit.

As a result, the amount of the heat transferred from the refrigerant circuit to the high temperature water cooling circuit is suppressed, so that the heat exhaust from the high temperature-side heat exchanger can be suppressed.

In addition, in the above, the heat exhaust suppression control may be executed as control for suppressing heat generation in the refrigerant circuit.

As a result, a demand for heat exhaust from the refrigerant circuit to the high temperature water cooling circuit is reduced by the suppression of the heat generation in the refrigerant circuit, so that the amount of the heat transferred from the refrigerant circuit to the high temperature water cooling circuit can be reduced to suppress the heat exhaust from the high temperature-side heat exchanger.

In addition, in the above, the control for suppressing the heat generation in the refrigerant circuit may be executed by performing at least one of lowering of a rotation speed upper limit value of a compressor provided in the refrigerant circuit and forcible circulation of internal air as air conditioning in a vehicle cabin.

As a result, the demand for the heat exhaust from the refrigerant circuit to the high temperature water cooling circuit is reduced by direct lowering of the rotation speed upper limit value of the compressor or indirect lowering of the rotation speed of the compressor by the forcible circulation of the internal air, so that the amount of the heat transferred from the refrigerant circuit to the high temperature water cooling circuit can be reduced to suppress the heat exhaust from the high temperature-side heat exchanger. In addition, by using the direct lowering of the rotation speed upper limit value of the compressor and the forcible circulation of the internal air in combination, the amount of the heat transferred from the refrigerant circuit to the high temperature water cooling circuit can be reduced to suppress the heat exhaust from the high temperature-side heat exchanger while avoiding a deterioration in air conditioning performance as much as possible.

With the in-vehicle temperature control system according to the present disclosure, it is possible to, as the heat exhaust from the high temperature-side heat exchanger is suppressed, promote the heat exhaust from the low temperature-side heat exchanger, and suppress the cooling capacity shortage.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the in-vehicle temperature control system according to the disclosure will be described. The disclosure is not limited to the embodiment.

Figure 1:
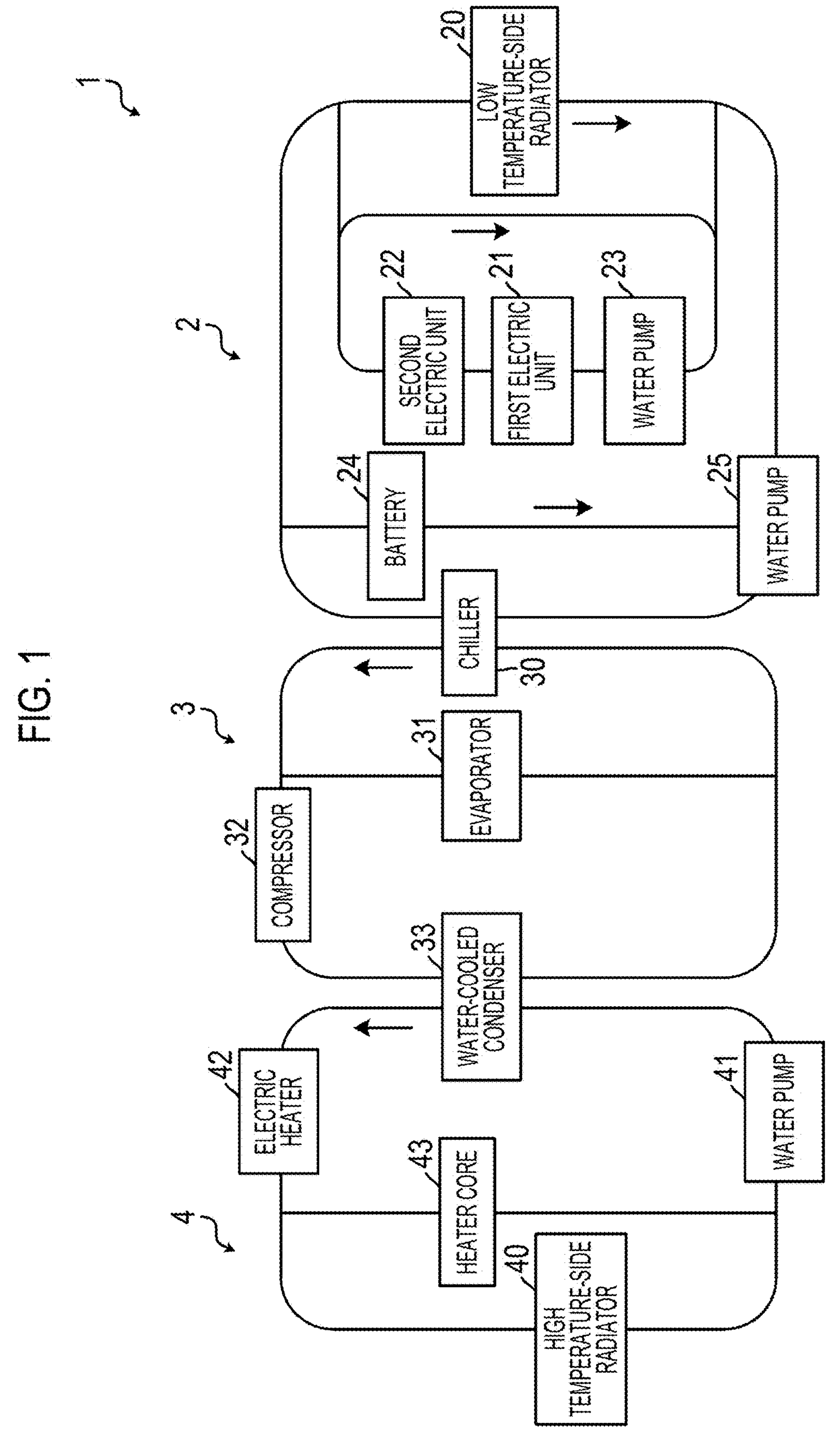
FIG. 1 is a block diagram showing a schematic configuration of an in-vehicle temperature control system according to an embodiment.

FIG. 1 is a block diagram showing a schematic configuration of an in-vehicle temperature control system 1 according to the embodiment.

The in-vehicle temperature control system 1 according to the embodiment includes a low temperature water cooling circuit 2, a refrigerant circuit 3, and a high temperature water cooling circuit 4, and is mounted in the vehicle.

The low temperature water cooling circuit 2 is a circuit that circulates coolant as a heat medium in a flow path formed by a pipe or the like, and is constituted of a low temperature-side radiator 20, a first electric unit 21, a second electric unit 22, a water pump 23, a battery 24, a water pump 25, and the like. The low temperature-side radiator 20 is a low temperature-side heat exchanger that exchanges heat between the coolant and the outside air to cool the coolant. The first electric unit 21, the second electric unit 22, and the battery 24 can perform heat exhaust to the coolant through a water jacket that constitutes a part of the flow path of the coolant. The water pumps 23, 25 control the heat radiation amount in the low temperature-side radiator 20, the heat exhaust amount from the first electric unit 21, the second electric unit 22, and the battery 24 to the coolant, and the heat amount moved (heat absorption amount) to the refrigerant circuit 3 through the chiller 30 to be described later by adjusting the flow velocity and the flow rate of the coolant. A temperature of coolant circulating through the low temperature water cooling circuit 2 is usually maintained lower than a temperature of coolant circulating through the high temperature water cooling circuit 4.

The low temperature water cooling circuit 2 is formed with a circulation path through which the coolant is circulated by the water pump 25 at least between the battery 24 and the chiller 30 to cool the battery 24 by transferring the heat transferred from the battery 24 to the coolant to the refrigerant circuit 3 via the chiller 30. The low temperature water cooling circuit 2 is formed with a circulation path through which the coolant is circulated by the water pump 23 at least between the low temperature-side radiator 20, the first electric unit 21 and the second electric unit 22, in order to cool the first electric unit 21 and the second electric unit 22 by radiating (exhausting) the heat transferred from the first electric unit 21 and the second electric unit 22 to the coolant to the low temperature-side radiator 20.

As the device to be cooled by the heat radiation (heat exhaust) at the low temperature-side radiator 20 in the low temperature water cooling circuit 2, for example, there are a motor generator and a PCU (inverter, DCDC converter, and the like) provided in each of the first electric unit 21 and the second electric unit 22, and a charger/discharger used for charging and discharging a battery 24 mounted on the vehicle. The battery 24 of the low temperature water cooling circuit 2 performs cooling (final heat exhaust to the high temperature-side radiator 40 of the high temperature water cooling circuit 4) using the chiller 30, but the present disclosure is not limited thereto. For example, in a case where the battery 24 is directly cooled by the low temperature water cooling circuit 2 by heat radiation (heat exhaust) from the low temperature-side radiator 20 of the low temperature water cooling circuit 2, the battery 24 is also included in the device that is cooled by the low temperature-side radiator 20 of the low temperature water cooling circuit 2.

The refrigerant circuit 3 is a circuit that circulates the refrigerant while changing the state of the refrigerant as a heat medium, and is constituted of a chiller 30, an evaporator 31, a compressor 32, a water-cooled condenser 33, and the like. In the refrigerant circuit 3, the refrigerant compressed by the compressor 32 is condensed by the water-cooled condenser 33, and the condensed refrigerant is expanded by being injected into the evaporator 31 from the expansion valve provided in the evaporator 31 to perform heat absorption from the air of the evaporator 31. The chiller 30 is a unit that can absorb heat from the coolant of the low temperature water cooling circuit 2 and exhaust heat to the refrigerant. The evaporator 31 and the compressor 32 are units that can perform heat exhaust to the refrigerant. The water-cooled condenser 33 is a unit that can absorb heat from the refrigerant and exhaust heat to the coolant of the high temperature water cooling circuit 4. The refrigerant circuit 3 is coupled to the low temperature water cooling circuit 2 through the chiller 30 for heat exchange such that heat generated in the low-temperature water cooling circuit 2 can be transferred to the refrigerant circuit 3 through the chiller 30. The refrigerant circuit 3 is coupled to the high temperature water cooling circuit 4 through the water-cooled condenser 33 for heat exchange such that heat generated in the refrigerant circuit 3 and/or heat transferred from the low temperature water cooling circuit 2 to the refrigerant circuit 3 can be transferred to the high temperature water cooling circuit 4 through the water-cooled condenser 33.

The high temperature water cooling circuit 4 is a circuit that circulates coolant as a heat medium, and is constituted of a high temperature-side radiator 40, a water pump 41, an electric heater 42, a heater core 43, and the like. The high temperature water cooling circuit 4 has a function of storing heat in the coolant for heating as air conditioning in the vehicle cabin and a function of radiating (exhausting) the heat received from the refrigerant circuit 3 to the outside of the vehicle by heat exchange. The high temperature-side radiator 40 is a high temperature-side heat exchanger that exchanges heat between the coolant and the outside air for air-cooling the coolant. The water pump 41 is a unit that circulates the coolant, and can change the heat radiation amount (heat exhaust amount) of the high temperature-side radiator 40 or the heat amount moved from the refrigerant circuit 3 through the water-cooled condenser 33 by adjusting the flow velocity or the flow rate of the coolant. The electric heater 42 is a unit that heats the coolant when the temperature of the coolant is insufficient. The heater core 43 is a unit having a tube through which the coolant flows and fins, and performs heat exchange between air passing through the fins and the coolant.

In the high temperature water cooling circuit 4, the type of the device to be cooled by the heat radiation (heat exhaust) at the high temperature-side radiator 40 and the direct or indirect heat exhaust is the compressor 32, the evaporator heat absorption, the chiller heat absorption (=battery heat exhaust), and the like. In a case where the engine heat exhaust or the like is directly connected to the high temperature water cooling circuit 4 or is indirectly exhausted from the high temperature-side radiator 40 of the high temperature water cooling circuit 4 via the high temperature water cooling circuit 4, the high temperature-side radiator 40 of the high temperature water cooling circuit 4 is not directly or indirectly exhausted.

The configuration of the low temperature water cooling circuit 2 and the high temperature water cooling circuit 4 is not particularly limited as long as the circuits can exhaust heat from the low temperature-side radiator 20 and the high temperature-side radiator 40. For example, a configuration in which a device can be cooled each time by using a switching valve, a disposition order of devices to be cooled, and the like are not particularly limited.

In the in-vehicle temperature control system 1 according to the embodiment, the low temperature-side radiator 20 of the low temperature water cooling circuit 2 and the high temperature-side radiator 40 of the high temperature water cooling circuit 4 are provided to be adjacent to each other, and the radiators share the plurality of heat radiation fins with a common heat radiation unit. In the in-vehicle temperature control system 1 according to the embodiment, a mechanism for temporarily restricting the heat exhaust at the high temperature-side radiator 40 of the high temperature water cooling circuit 4 is provided.

Figure 2:
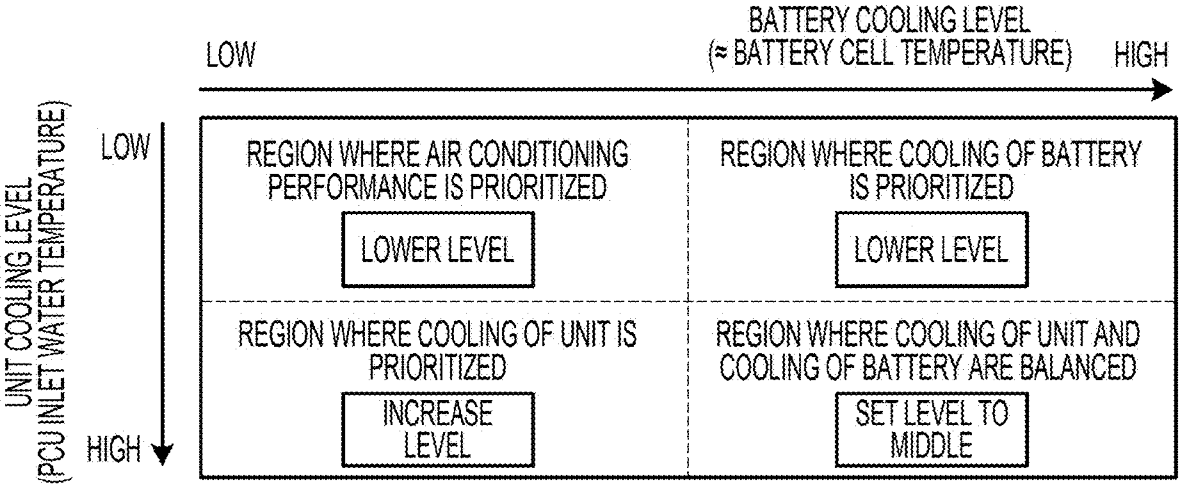
FIG. 2 is a diagram showing a control level in the in-vehicle temperature control system according to the embodiment.

FIG. 2 is a diagram showing a limit level of heat exhaust at the high temperature-side radiator 40 in the in-vehicle temperature control system 1 according to the embodiment. The battery cooling level in FIG. 2 is the strength of the demand for cooling the battery 24, and the strength of the demand becomes stronger as the battery cell temperature of the battery 24 is higher. The unit cooling level in FIG. 2 is the strength of the demand for cooling the first electric unit 21 and the second electric unit 22 (motor generator, a PCU (inverter, DC-DC converter, and the like), and a charger/discharger) in the low temperature water cooling circuit 2, and is determined by the target temperature of the cooling object, the temperature of the coolant, the influence of the function that fails, and the like.

As shown in FIG. 2, in a region where the battery cooling level is low and the unit cooling level is low, the limit level of the heat exhaust at the high temperature-side radiator 40 is lowered to give priority to the air conditioning performance. As shown in FIG. 2, in a region where the battery cooling level is high and the unit cooling level is low, the limit level of the heat exhaust at the high temperature-side radiator 40 is set low to give priority to the cooling of the battery 24 through the chiller 30. As shown in FIG. 2, in a region where the battery cooling level is low and the unit cooling level is high, the limit level of the heat exhaust at the high temperature-side radiator 40 is increased, and the heat exhaust from the low temperature water cooling circuit 2 is promoted to prioritize the cooling of the unit. As shown in FIG. 2, in a region where the battery cooling level is high and the unit cooling level is high, the limit level of the heat exhaust at the high temperature-side radiator 40 is set to be intermediate, and the cooling of the unit and the cooling of the battery 24 are balanced.

Figure 3:
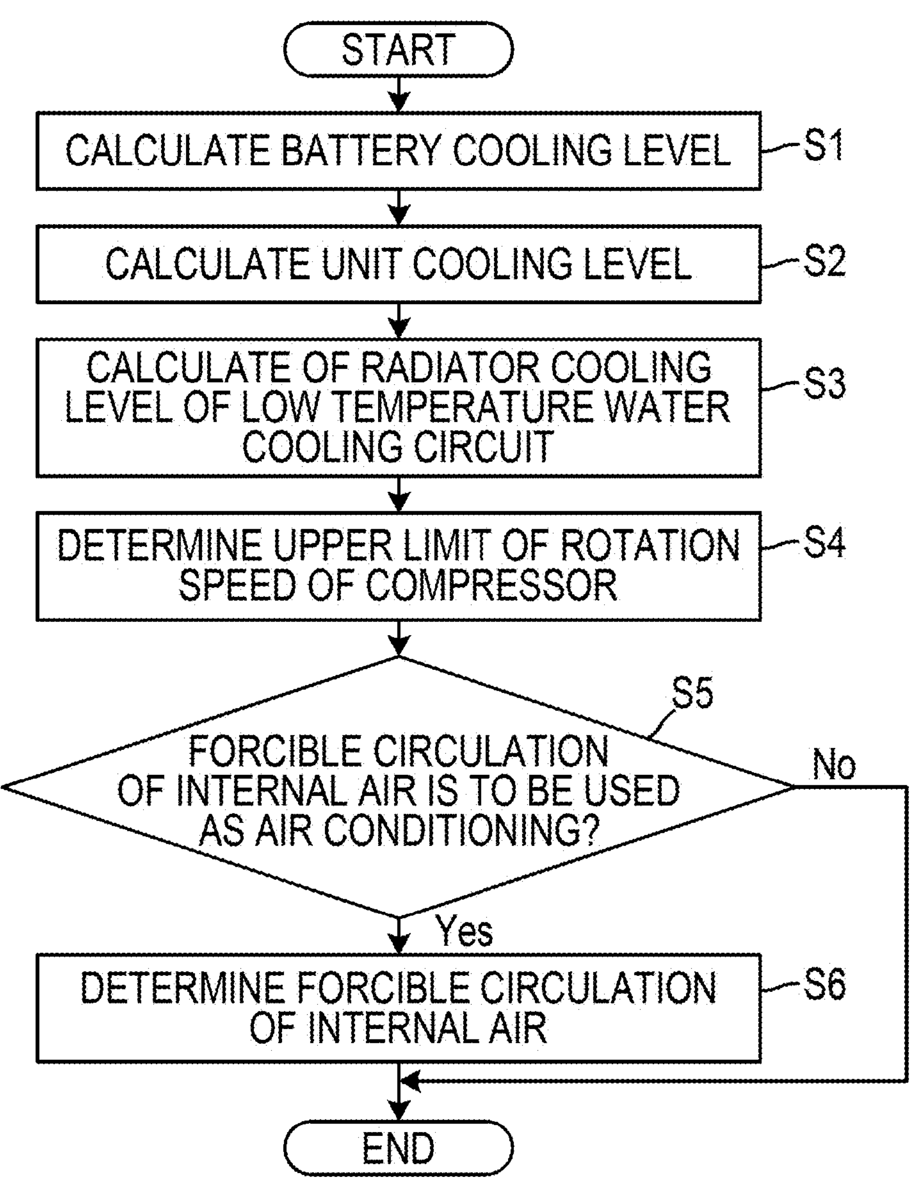
FIG. 3 is a flowchart showing an example of temperature control in the in-vehicle temperature control system according to the embodiment.

FIG. 3 is a flowchart showing an example of the temperature control in the in-vehicle temperature control system 1 according to the embodiment. The temperature control shown in FIG. 3 is executed by, for example, an electronic control device mounted on a vehicle. Various pieces of information needed for the electronic control device to perform the temperature control are acquired by, for example, various sensors provided in the low temperature water cooling circuit 2, the refrigerant circuit 3, and the high temperature water cooling circuit 4, and are transmitted to the electronic control device. The electronic control device is capable of controlling the operation of various units (devices), such as the water pumps 23, 25, 41, the compressor 32, the electric heater 42, and the air conditioning, provided in each of the low temperature water cooling circuit 2, the refrigerant circuit 3, and the high temperature water cooling circuit 4.

First, in the in-vehicle temperature control system 1, the electronic control device calculates the battery cooling level (step S1). Next, in the in-vehicle temperature control system 1, the electronic control device calculates the unit cooling level (step S2). Next, in the in-vehicle temperature control system 1, the electronic control device calculates the radiator cooling level of the low temperature water cooling circuit 2 (step S3). The radiator cooling level of the low temperature water cooling circuit 2 is determined from the battery cooling level calculated in step S1 and the unit cooling level calculated in step S2. When the radiator cooling level of the low temperature water cooling circuit 2 is increased, the air conditioning (cooling or dehumidification) that exhausts heat from the high temperature-side radiator 40 of the high temperature water cooling circuit 4 or the cooling of the battery 24 using the chiller 30 is partially limited. On the contrary, when the radiator cooling level of the low temperature water cooling circuit 2 is lowered, the limitation of the air conditioning (cooling or dehumidification) or the cooling of the battery 24 using the chiller 30 that exhausts heat from the high temperature-side radiator 40 of the high temperature water cooling circuit 4 is relaxed.

Next, in the in-vehicle temperature control system 1, the electronic control device calculates the rotation speed upper limit of the compressor 32 of the refrigerant circuit 3 (step S4). The upper limit rotation speed of the compressor 32 is lowered according to the radiator cooling level of the low temperature water cooling circuit 2. That is, when the radiator cooling level of the low temperature water cooling circuit 2 is high, the upper limit rotation speed of the compressor 32 is reduced to limit the compressor work. As a result, the heat absorption amount by the refrigerant circuit 3 can be reduced, and thus the heat exhaust amount by the high temperature-side radiator 40 of the high temperature water cooling circuit 4 can be reduced.

Next, in the in-vehicle temperature control system 1, the electronic control device determines whether or not to forcibly perform the inside air circulation of the air conditioning in response to the radiator cooling level of the low temperature water cooling circuit 2 (step S5). The forced inside air circulation of the air conditioning is performed when the radiator cooling level of the low temperature water cooling circuit 2 is higher than a threshold value. In the in-vehicle temperature control system 1, when the electronic control device determines that the air conditioning does not forcibly perform the inside air circulation (No in step S5), the forced inside air circulation is not performed, and the series of control is ended. In the in-vehicle temperature control system 1, when the electronic control device determines that the air conditioning forcibly performs the inside air circulation (Yes in step S5), the electronic control device decides the forced inside air circulation (step S6), and the forced inside air circulation is performed. By performing the forced inside air circulation, the heat absorption amount of the refrigerant circuit 3 can be reduced, and thus the heat exhaust amount of the high temperature-side radiator 40 of the high temperature water cooling circuit 4 can be reduced. Thereafter, the in-vehicle temperature control system 1 ends the series of controls.

The in-vehicle temperature control system 1 according to the embodiment includes a low temperature water cooling circuit 2 and a high temperature water cooling circuit 4 through which heat can be transferred via a refrigerant circuit 3. The low temperature-side radiator 20 provided in the low temperature water cooling circuit 2 and the high temperature-side radiator 40 provided in the high temperature water cooling circuit 4 have a common heat radiation unit. In the in-vehicle temperature control system 1 according to the embodiment, the exhaust heat suppression control for suppressing the heat dissipation from the high temperature-side radiator 40 is executed under a predetermined condition in which the cooling in the predetermined low temperature water cooling circuit 2 (low temperature-side radiator 20) is prioritized based on the state of the unit that is cooled by the heat radiation (heat exhaust) from the low temperature-side radiator 20. The in-vehicle temperature control system 1 according to the embodiment can suppress the insufficient cooling capacity by suppressing the heat exhaust from the high temperature-side radiator 40 of the high temperature water cooling circuit 4 and promoting the heat exhaust from the low temperature-side radiator 20 of the low temperature water cooling circuit 2.

In the in-vehicle temperature control system 1 according to the embodiment, the exhaust heat suppression control may be executed as control for suppressing the heat amount moved from the refrigerant circuit 3 to the high temperature water cooling circuit 4. As a result, the heat amount moved from the refrigerant circuit 3 to the high temperature water cooling circuit 4 is suppressed, so that the heat exhaust from the high temperature-side radiator 40 can be suppressed.

In the in-vehicle temperature control system 1 according to the embodiment, the exhaust heat suppression control may be executed as control for suppressing the heat generation in the refrigerant circuit 3. As a result, the heat generation in the refrigerant circuit 3 is suppressed, so that the demand for the exhaust heat from the refrigerant circuit 3 to the high temperature water cooling circuit 4 is reduced. Therefore, the heat amount moved from the refrigerant circuit 3 to the high temperature water cooling circuit 4 is reduced, and the heat exhaust from the high temperature-side radiator 40 can be suppressed.

In the in-vehicle temperature control system 1 according to the embodiment, the control for suppressing the heat generation in the refrigerant circuit 3 may be executed by lowering the rotation speed upper limit value of the compressor 32 provided in the refrigerant circuit 3 and/or forcibly performing the inside air circulation as the air conditioning in the vehicle cabin. As a result, the demand for the exhaust heat from the refrigerant circuit 3 to the high temperature water cooling circuit 4 is reduced due to the direct reduction of the rotation speed upper limit value of the compressor 32 or the indirect reduction of the rotation speed of the compressor by forcibly performing the inside air circulation. Therefore, the heat amount moved from the refrigerant circuit 3 to the high temperature water cooling circuit 4 is reduced, and the heat exhaust from the high temperature-side radiator 40 can be suppressed. In addition, by using the direct reduction of the rotation speed upper limit value of the compressor 32 and the forced inside air circulation in combination, it is possible to reduce the heat amount moved from the refrigerant circuit 3 to the high temperature water cooling circuit 4 and to suppress the heat exhaust from the high temperature-side radiator 40 while avoiding the deterioration in the air conditioning performance as much as possible.

In the in-vehicle temperature control system 1 according to the embodiment, for example, a mechanism for limiting the compressor work and limiting the heat absorption amount by the evaporator 31 of the refrigerant circuit 3 is provided, but the mechanism for limiting the heat exhaust from the high temperature-side radiator 40 of the high temperature water cooling circuit 4 is not particularly limited. The method may be a method of switching to a method of using a cooling device that does not inhibit heat dissipation of the low temperature-side radiator 20 of the low temperature water cooling circuit 2 other than the high temperature-side radiator 40 of the high temperature water cooling circuit 4 or a method of exhausting heat to another heat utilization destination. In addition, a method of reducing the efficiency of the high temperature-side radiator 40 of the high temperature water cooling circuit 4 by reducing the output of the water pump 41 of the high temperature water cooling circuit 4 to reduce the coolant circulation amount in the high temperature water cooling circuit 4 may be employed.

What is claimed is:

1. An in-vehicle temperature control system comprising:
- a refrigerant circuit including a compressor;
- a low temperature water cooling circuit and a high temperature water cooling circuit that are configured to exchange heat each other through the refrigerant circuit, the low temperature water cooling circuit including a low temperature-side heat exchanger, a battery, a motor generator, an inverter, a converter, a charger, a discharger, and a radiator, and the high temperature water cooling circuit including a high temperature-side heat exchanger;
- a plurality of radiation fins shared by the low temperature water cooling circuit and the high temperature water cooling circuit; and
- an electronic control device mounted on a vehicle configured to
  - calculate a cooling level of the battery,
  - calculate a cooling level of each of the motor generator, the inverter, the converter, the charger, and the discharger,
  - calculate a cooling level of the radiator based on the cooling level of the battery and the cooling level of each of the motor generator, the inverter, the converter, the charger, and the discharger, and
  - calculate a rotation speed upper limit of the compressor based on the cooling level of the radiator, wherein the rotation speed upper limit decreases as the cooling level of the radiator increases.

2. The in-vehicle temperature control system according to claim 1, wherein the electronic control device is further configured to:
- determine whether to switch air conditioning in a vehicle cabin to inside air circulation based on the cooling level of the radiator; and
- switch the air conditioning to the inside air circulation in response to a determination to switch the air conditioning to the inside air circulation.

3. The in-vehicle temperature control system according to claim 1, wherein the cooling level of the battery is strength of demand for cooling the battery, and the strength of the demand for cooling the battery becomes stronger as a battery cell temperature of the battery increases.

4. The in-vehicle temperature control system according to claim 1, wherein the cooling level of each of the motor generator, the inverter, the converter, the charger, and the discharger is strength of demand for cooling each of the motor generator, the inverter, the converter, the charger, and the discharger in the low temperature water cooling circuit and is determined based on a temperature of at least one of the motor generator, the inverter, the converter, the charger, and the discharger, and a temperature of a coolant in the low temperature water cooling circuit.

5. The in-vehicle temperature control system according to claim 1, wherein:
- in a case where the cooling level of the radiator is increased, cooling or dehumidification that exhausts heat from a radiator included in the high temperature water cooling circuit, or cooling of the battery using a chiller, is partially limited; and in a case where the cooling level of the radiator is decreased, limitation of the cooling, dehumidification, or the cooling of the battery is relaxed.

6. The in-vehicle temperature control system according to claim 1, wherein:

the low temperature water cooling circuit further includes a water pump and a chiller; and the electronic control device is further configured to control the water pump and the chiller to partially limit cooling of the battery in a case where the cooling level of the radiator is increased, and control the water pump and the chiller to relax the limitation on the cooling of the battery in a case where the cooling level of the radiator is decreased.

7. The in-vehicle temperature control system according to claim 1, wherein the electronic control device is further configured to cause the compressor to operate so that rotation speed of the compressor does not exceed the calculated rotation speed upper limit.

8. The in-vehicle temperature control system according to claim 2, wherein the electronic control device is further configured to determine to switch the air conditioning in the vehicle cabin to the inside air circulation in a case where the cooling level of the radiator is higher than a threshold value.

* * * * *